(12) United States Patent
Patel

(10) Patent No.: US 10,326,609 B1
(45) Date of Patent: Jun. 18, 2019

(54) SYSTEM AND METHOD FOR AUTOMATIC ASSOCIATION COORDINATOR MODULE PRE-CONFIGURATION

(71) Applicant: Sanjay Patel, Raleigh, NC (US)

(72) Inventor: Sanjay Patel, Raleigh, NC (US)

(*) Notice: Subject to any disclaimer, the term of this patent is extended or adjusted under 35 U.S.C. 154(b) by 0 days.

(21) Appl. No.: 15/918,922

(22) Filed: Mar. 12, 2018

Related U.S. Application Data

(63) Continuation-in-part of application No. 15/082,268, filed on Mar. 28, 2016, now abandoned.

(51) Int. Cl.
  *H04M 1/725* (2006.01)
  *H04W 12/08* (2009.01)
  *H04L 12/28* (2006.01)
  *H04L 12/24* (2006.01)

(52) U.S. Cl.
  CPC .......... *H04L 12/281* (2013.01); *H04L 12/282* (2013.01); *H04L 41/0809* (2013.01); *H04L 41/22* (2013.01); *H04L 2012/2841* (2013.01)

(58) Field of Classification Search
  CPC .... G05B 15/02; H04L 12/2807; H04W 12/06; H04W 84/12
  USPC ........ 709/217, 224, 220, 246, 202; 715/771, 715/744; 370/395.53, 401, 392; 340/635, 3.7, 654; 455/412.1; 345/764; 700/3, 86, 7
  See application file for complete search history.

(56) References Cited

U.S. PATENT DOCUMENTS

| | | | | |
|---|---|---|---|---|
| 8,131,875 B1* | 3/2012 | Chen | ................ | H04M 1/72522 707/E17.121 |
| 9,984,686 B1* | 5/2018 | Mutagi | ................... | G10L 15/22 |
| 2004/0046795 A1* | 3/2004 | Josephson | .............. | G06F 3/011 715/764 |
| 2006/0125649 A1* | 6/2006 | Ostrovsky | ............. | G05B 15/02 340/635 |
| 2006/0156276 A1* | 7/2006 | Brown | ................... | G06Q 10/06 717/104 |
| 2007/0100990 A1* | 5/2007 | Brown | ............... | H04L 43/0817 709/224 |
| 2007/0116013 A1* | 5/2007 | Brown | ................... | G06Q 10/06 370/395.53 |
| 2007/0198663 A1* | 8/2007 | Helander | ............ | H04L 41/0806 709/220 |
| 2009/0171474 A1* | 7/2009 | Birze | ................... | G05B 19/042 700/3 |
| 2010/0281135 A1* | 11/2010 | Cohn | ..................... | G08B 29/02 709/217 |
| 2011/0113360 A1* | 5/2011 | Johnson | ............. | H04L 12/2825 715/771 |

(Continued)

*Primary Examiner* — Tan H Trinh
(74) *Attorney, Agent, or Firm* — John L. Sotomayor

(57) ABSTRACT

This document presents a system and method for preference pre-configuration of automatic association coordinator modules used to control lights, audio systems, and any other home automation device. The preferences define and control moods and experiences associated with one or more spaces within a residential or commercial property. Moods and experiences may be defined by the user to present specified settings for audio, lighting, security, or other parameters that contribute to a mood for a given space. Timing and triggers may be created and saved with the moods and experiences to permit automatic, delayed, and cascading ambiance settings for one or more spaces.

12 Claims, 16 Drawing Sheets

(56) References Cited

U.S. PATENT DOCUMENTS

| | | | |
|---|---|---|---|
| 2011/0249674 A1* | 10/2011 | Chang | H04L 12/58 370/392 |
| 2015/0131485 A1* | 5/2015 | Brandt | H04L 1/00 370/254 |
| 2015/0134794 A1* | 5/2015 | Hibara | H04L 12/2807 709/222 |
| 2015/0177720 A1* | 6/2015 | Anderson | G05B 15/02 700/90 |
| 2016/0103461 A1* | 4/2016 | Maruyama | H02J 3/14 307/126 |
| 2016/0164831 A1* | 6/2016 | Kim | H04L 43/08 709/223 |
| 2016/0261425 A1* | 9/2016 | Horton | G05B 15/02 |
| 2016/0364114 A1* | 12/2016 | Von Dehsen | H04L 12/2807 |
| 2017/0079257 A1* | 3/2017 | Haensgen | H04W 76/14 |
| 2017/0180062 A1* | 6/2017 | Johansen | H04W 4/70 |
| 2017/0187607 A1* | 6/2017 | Shaikh | H04L 45/02 |
| 2017/0213215 A1* | 7/2017 | Lee | G06Q 20/405 |
| 2017/0214744 A1* | 7/2017 | Neves | H04L 67/12 |
| 2018/0082685 A1* | 3/2018 | Carlin | G10L 15/22 |

* cited by examiner

SYSTEM AND METHOD FOR AUTOMATIC ASSOCIATION COORDINATOR MODULE PRE-CONFIGURATION

CLAIM TO PRIORITY

This Non-Provisional application claims under 35 U.S.C. § 120, the benefit as a Continuation In Part of the non-Provisional application Ser. No. 15/082,268, filed Mar. 28, 2016, Titled "Device Automatic Action Command and Sequence Control" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

This innovation relates generally to the home automation market. In a home automation system, many different electrical and mechanical elements can be controlled via electrical connection into one or more electrical circuits. Many times, a user may wish to control these elements synchronously via a single action such as selecting a switch or pressing a button. An electrical circuit may be configured to activate and deactivate a multitude of devices providing light, audio, temperature control, security control and any other functions that an owner of a property may wish to have under automated control.

Home automation may also consist of input and decision control such that timers and other delay devices may be employed to activate circuit control when an owner is not present. Configuring a home automation system may include the attachment of a decision execution device such as a computer processor connected to the input of the electrical circuit to process actions associated with decisions desired by the home owner.

Configuring desirable settings for an automatic setup may include pre-established user settings associated with particular locations or spaces. Pre-established user settings may be entered into the control system to be recalled automatically at any time a user may choose to achieve the desired result.

Increasingly, home automation includes connections to devices not only in multiple locations within a home, but also requires connections to external locations. These external connections may include connections to a public network, private network, intranet, specialized devices or networks, or the Internet. Facilitating connections to such exterior locations may require specialized processes to insure timely and optimized connections and communications over such external channels once a connection has been completed successfully.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
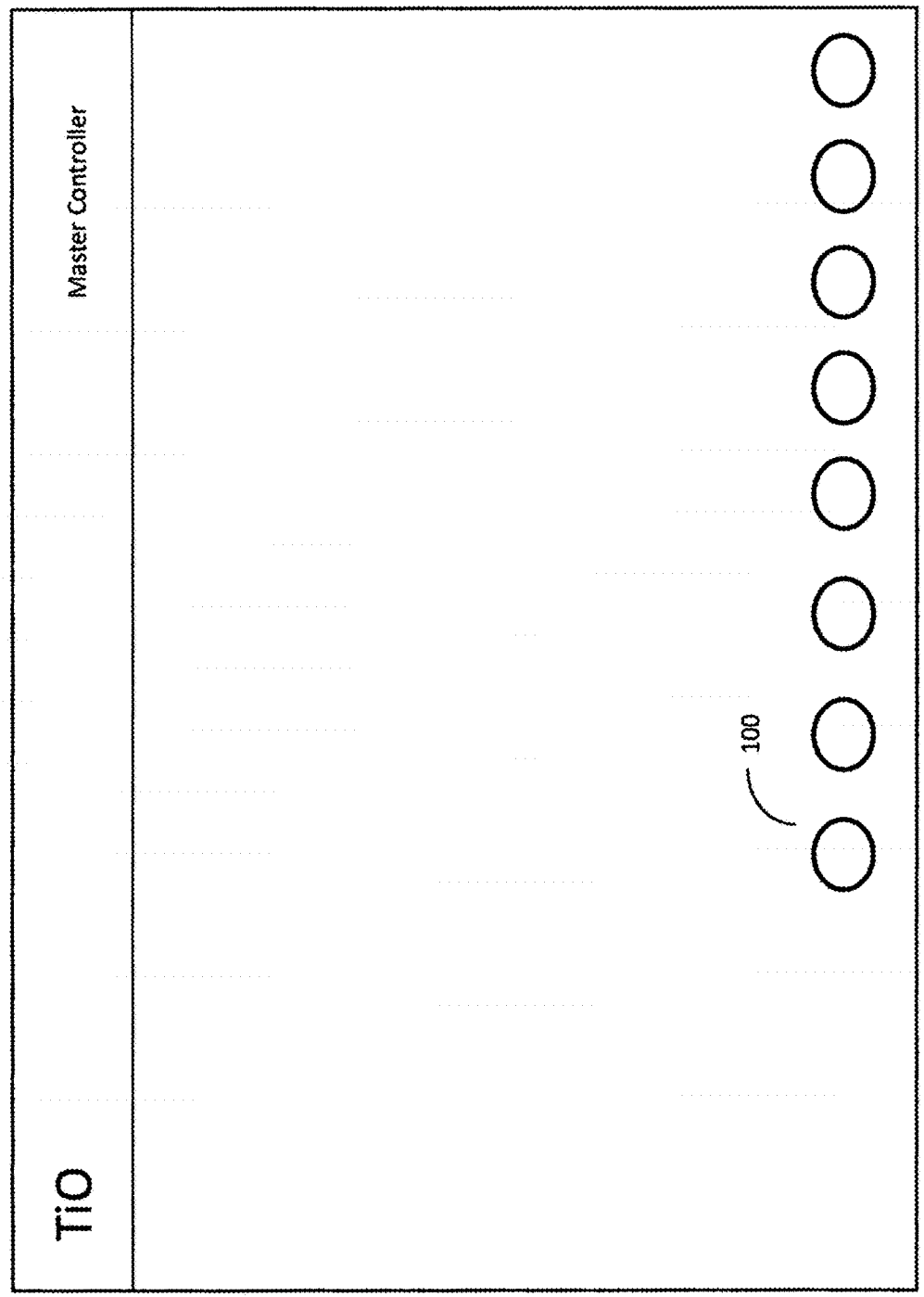
FIG. 1 is a view of a master coordinator module consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "device" and "mobile device" refers to any handheld device such as, but not limited to, a cell phone, smart phone, tablet, iPad, networked computer, internet computer, watch or any other device a user may carry when travelling from place to place and interact with one or more networks. Reference throughout this document to a "mood" refers to capturing the state of all audio, visual, multimedia, and other elements that contribute to a particular ambient experience in a given space.

Reference throughout this document to an "experience" refers to capturing a collection of defined moods for a variety of spaces where each mood in each space defined for an experience is initiated with the selection and initiation of the experience.

References throughout this document to an "action" refers to a single state change of a particular element contained within a home automation system. Actions include, but are not limited to, turning a light on or off, stopping or starting music, changing the volume of a music playback, setting temperature and environmental controls, setting timers, controlling security systems, and other similar actions a user might take in their home to control one or more devices that contributes to a mood or an experience.

A common issue in wireless based automation systems is how to pair or associate particular devices installed within one or more spaces with the system central hub or network access point to facilitate external or networked control of one or more devices, or groups of devices. In the case of WiFi, the network identifier, or Service Set Identifier (SSID), is commonly selected from a list of available networks shown on the display of a PC or mobile device and the password is entered via a keyboard or touchscreen input to permit access to the particular device or group of devices. For devices or groups of devices that do not have a complex user interface a user often has a cumbersome input capability. Common methods to pair these types of devices with an access point require a complicated set of button presses on both the access point and the device resulting in difficult and unreliable pairing, the pairing action also requiring a substantial amount of time to complete due to the need to manually pair each device. In a particular example, a WiFi enabled light-switch does not provide a user interface to view available networks or enter a password for a given network. The user interface is restricted to activation buttons built into the device, with the sequence of button presses being interpreted by the receiving processor as the user interacts with the device.

In an exemplary embodiment, an improved automatic association process for pairing these types of devices is presented herein. The automatic association process leverages the ability of a WiFi access point to provide access to multiple networks via unique SSIDs. In the automatic association process, when a user wishes to pair a device that is not currently associated with or attached to a network, the access point can provide a second network to which a number of devices may be associated, or paired, temporarily through manual configuration or through a PC or mobile application. This second network's SSID is programmatically determined such that approved devices can scan for this specific network. This second network's SSID is available on the PC, iPad, or mobile application with which each device is in communication. Additionally, the credentials required for this secondary network can be calculated using a chosen algorithm. These two key details allow an unpaired device to discover and connect to the association network, after which, the primary network, which is the external network permitting each device to contact and communicate with external servers and devices, has a name and passkey that may be passed over secure channels. When the primary network's name and passkey is received by the device, the device simply disconnects from the association network and connects to the primary network, completing the automatic association process.

In an exemplary embodiment, for the automatic association action, each device may be configured to transmit an activation signal to the main processor of the system when the portion of the physical component is selected. The selection of the portion of the physical component that forms the control button may be performed through touching the control button, or through an activation signal from a handheld unit such as a smart phone, tablet, internet computer, or other handheld device. A physical component of the system, such as, in a non-limiting example, a light dimmer switch, may be selected to be associated with the secondary network by adding the device to an association data base. The light dimmer switch may be configured to automatically calculate the passkey for the secondary network and pair with the secondary network when the pairing list is selected by a user.

In an embodiment, the primary benefits to network association include simplification of use of a home automation system and the ability to control elements that are not electrically connected to each other and are located remotely from the master coordinator unit. In the first instance, the action groups allow users to more efficiently execute multiple desired actions simultaneously. In the second instance, the ability to control "remote" elements, those that are not electrically connected to each other may include, in a non-limiting example, elements located in one physical location, such as a house or other building, and elements located in a second physical location, such as a detached garage, outbuilding, guard shack, or any other physical location. Each element must be configured within and addressable by the master coordinator unit to permit a control signal to be sent through a network communication channel when a control button is selected. Network capable devices may be a device operable to control any of a light, light system, sound system, multimedia device, multimedia system, temperature control, network capable appliance, or any device installed to operate a device or system associated with a commercial or residential space. Pairing each network capable device with an external network simplifies ability to send control signals to each physical device so as to create control over each network capable device, as well as permitting existing installations to keep their current electrical wiring yet still receive the advantage of control through a command communicated through a network.

In addition to devices and control actions that are defined in the system, the user may have the ability to add new devices to a pairing action list in a dynamic fashion. In a non-limiting example of this configuration update capability, each network capable device is attached to an association network that is maintained and managed by the master coordinator unit. The association network has a known SSID that is installed within each network capable device as a part of the initial configuration at the factory. Additionally, the association network passkey is based upon a calculation that may be performed within the network capable device so as to permit each network capable device to derive the association network passkey. With the association network SSID and passkey, each network capable device may then establish a connection, or 'pair with', the association network.

In this exemplary embodiment, the master coordinator unit may connect to an exterior network through the entry by a user of the SSID and passkey of the exterior network. The master coordinator unit may then pass the external network SSID and passkey to each network capable device upon the initiation of a pairing action with the external network. Each network capable device may then replace the association network SSID and calculated passkey with the exterior network SSID and passkey to change network connection from the association network to the exterior network. The master coordinator unit may now connect to all network capable devices through the exterior network channel. At the completion of this process, all network capable devices in a space are configured to connect with an exterior network with a minimum of user intervention.

In an embodiment, with the automated pairing actions completed, all devices are connected to the system and actions for each device become available to a user. Upon completion, action command and action sequence processing may be enabled to create and provide access to action sequences that may form the basis of user operation of devices provided by the automatic association capability. In a non-limiting example, these functions may be implemented as a portion of the Connect software module installed and operational on the system server and available to the user on the master coordinator unit display. In this function, an action command message triggers the Connect software module to traverse a connected device's configuration file for an action name for a desired and available device action. If the Connect software module finds a match for the action name, the Connect software module sends the end-device a command that corresponds to that action name. An action sequence, which in this non-limiting example, is a series of action commands saved as a sequence of actions to be performed in a sequential manner, is triggered in a similar fashion to the triggering of an action command. An action sequence may also contain delays in timing of actions stored in the sequence of action names.

In this embodiment, a user is presented with access to action commands that may be concatenated together to form an action command sequence. Commands such as turning named devices on and off, toggling between devices, actions that may be performed by named devices while in operation (record, rewind, pause, start, stop, volume control, play, and additional device actions as available in the particular device configuration installed in the system) may each be selected by a user. The user selected commands may be installed in an action list, interspersed with delay commands, to build an action command sequence that the user may initiate simply by selecting the name of a stored action command sequence. Once selected, the user may initiate a retrieved action command sequence by selecting a single execute icon on the display of the master coordinator unit.

In an embodiment, the implementation of a mood begins with the selection of a space, either interior or exterior, and within that space the user may select all elements in the state that the user has determined may contribute to the mood the user wishes to define. With all selected elements in the state desired, the user captures all of the element settings within the selected space by selecting a "capture mood" selection button on a display, and associate this data capture with a mood. The mood is thus defined for the selected space. Additionally, a user may actively modify content for all elements as part of the save/real-time update upon mood capture. Not all elements within a selected space are required to be included in the mood definition and capture; a subset of the available elements in any space may be utilized to create a mood. A user may select additional spaces, select all desired elements within that space, create settings for each selected element, and capture this information as a mood for each additional space.

In this exemplary embodiment, the elements to be controlled may be electrically connected to one or more wired or wireless connections. The wired connections may be present to provide power and/or control signals, and the wireless connection may operate in conjunction with a wired electrical connection to provide configuration, command, and control signals. Each device connected to the system may have wired, wireless, or both types of electrical and control connectivity. In this exemplary embodiment, configuration and control instructions may be input to the system through a mobile application that may generally be provided for the user as a control entry mechanism. The mobile application may be downloaded to a smartphone, tablet, internet computer, or any other device containing a processor and the two-way communication necessary to connect with the Internet. The application may be downloaded from a central processing hub that serves as the command and control manager for the system. The elements to be controlled may be connected to the central hub via a wired or wireless connection as demonstrated in an associated example system diagram.

In an exemplary embodiment, to activate a mood, a user may be presented with a list of moods where the name or other identifier of each mood is presented as a control button to the user on a screen display of a mobile device, and moods and experiences may be triggered by a mobile device, computer, trigger, timer, light switch button presses, and other means. The control button may serve as a trigger for the named mood associated with the control button. A trigger may be assigned to a day and/or time to schedule the activation or deactivation of a mood. Triggers may be presented to a user on a mood page related to each space for which a mood has been created. Moods may be activated manually from the mood page for the space. Additionally, time frames for the activation of one or more moods may be specific calendar dates, specific times of the day, or may have a more dynamic and less objective timing definition such as "sunrise" or "sunset". Each mood may be triggered to activate on a periodic basis such as every day, or other defined, repeatable date and time combinations.

In an alternative embodiment, a mood may be activated through an external trigger connected to the system. An external trigger may be a motion sensor, audio sensor, infrared sensor, or any other sensor that may determine when a human being has entered a space for which a mood has been defined. The external trigger may be connected through either a wired or wireless connection to the system. As the human moves into the range of the sensor, triggering a response from the sensor to the master coordinator unit, a defined mood is activated in the space.

Moods may be defined to be activated at any time within a twelve-month timeframe. Moods may be triggered based upon alarms as well as sensors, such as, in a non-limiting example, a security system alarm. Additional trigger events may be defined as contact closures such as those that occur when opening a door or window. Any contact closure that indicates a transition from one state to another state may be associated with the system so as to activate a mood for the space in which the contact closure is detected.

In an exemplary implementation, a trigger may also be associated with an experience. Unlike a mood, which is defined for and assigned to a particular interior or exterior space, an experience is may load and execute a group of moods for a number of spaces simultaneously. In this fashion, an experience is capable of providing coordinated, designer, or disparate moods in a series of spaces to accommodate a user's design and plan for the spaces associated with an experience. In a non-limiting example, an experience may be defined to produce a party mood in interior or exterior spaces to which guests are to be entertained, and, simultaneously, produce a less-welcoming mood in spaces in which guests are to be discouraged from lingering. This type of experience may be defined by setting party moods in some spaces and less-welcoming moods in other spaces which are all associated with the experience. The experience may then be manually triggered by a user prior to the arrival of the first guest.

Alternatively, just as moods may be triggered by sensor or other activation signals, an experience may also be triggered by similar sensors or conditions. In a non-limiting example, a sensor may be associated with an experience that a user desires to trigger when they enter the space in which the sensor has been installed. The sensor would indicate to the system that a human has entered the space. The system would then activate the experience previously selected to be initiated upon the triggering of that particular sensor. Additionally, delays may be built into the definition of any mood or experience such that an activation signal from a sensor or other trigger may be subject to a previously input delay. The delay may be designed to permit a user to move from one space to another in an experience and have the experience be activated as the user arrives in the new space. Triggers and delays may be utilized to coordinate the activation and deactivation of moods and experiences in various spaces to enhance the user's use and enjoyment of the environment defined by the spaces.

In an embodiment, the primary benefits to the moods and experiences concept include simplification of use of a home automation system and the ability to control elements that are not electrically connected to each other and are located remotely from the master coordinator unit to create a desired ambiance or environmental "feel". In the first instance, the action groups allow users to more efficiently execute multiple desired actions simultaneously. In the second instance, the ability to control "remote" elements, those that are not electrically connected to each other may include, in a non-limiting example, elements located in one physical location, such as a house or other building, and elements located in a second physical location, such as a detached garage, outbuilding, guard shack, or any other physical location. The control of disparate devices may be combined into a single mood for a particular space, or may be combined in several moods each of which may have elements in multiple physical locations to create an experience. An experience may be a static experience, where each mood for each defined space is activated and remains in the activated mood. Alternatively, an experience may be a dynamic experience, where triggers and defined time periods and delays may permit the moods in spaces to activate, deactivate, or change to different elements as the user enters, leaves, or moves about in the spaces associated with the experience.

In an embodiment, a user may desire for certain moods and/or experiences to conform to certain customized settings, and may desire for such customized settings to be programmed prior to delivery at the user venue. The user may communicate preferences to a technician regarding pre-set moods and/or experiences. Such technician may adopt a consistent, reliable process for setting mood and experience settings based upon customized preferences, thus pre-configuring the module.

In an embodiment, the technician may unpack, power-up, and connect a new master coordinator module, which is a master command hardware device, to a network. The technician may then pair a device to the master coordinator module using, in a non-limiting example, the available network connection. In a non-limiting example, pairing would occur in part by manual operation of a push-button on the housing of the master coordinator module.

In an embodiment, the technician may unpack new control modules and hook one or of said control modules to a test fixture in communication with the network. Separately, the technician may prepare one or more control modules outside of the test fixture by capping off one of the leads on each control module, but otherwise connecting the control module to the network.

In an embodiment, the technician may open a device application to define, pair, identify, and manage elements, moods, and experiences. By using the application, the technician may generate a temporary system name that will automatically be replaced by an external network name. Via the application, the technician may update and identify the control module elements present on the network. Identified elements may be configured as being part of a particular space, per user direction.

In an embodiment, the technician may create moods based upon user-directed customization requests. The technician may group moods into collections of experiences, again based upon stated user preferences. Once the moods and experiences are created, the technician may power off the system, repack the master coordinator and control modules, and store the now-mated control modules and master coordinator together for conveyance to user.

Turning now to FIG. 1, a view of a master coordinator module consistent with certain embodiments of the present invention is shown. At 100, the newly-unpacked master coordinator is powered on and connected to a network. Once properly booted up, the master coordinator displays 4 (four) lights. In a non-limiting example, association with a network permits a user to establish a network-enabled communication link between the master coordinator module and each device within a residential dwelling. The master coordinator module has a primary network and an association network. The master coordinator module may then facilitate the connection and communication with an external network access point of the primary network through the use of the association network.

Figure 2A:
FIG. 2A is a view of a user interface for the pairing of a device with a master coordinator consistent with certain embodiments of the present invention.

Turning now to FIG. 2A, a view of a user interface for the pairing of a device with a master coordinator consistent with certain embodiments of the present invention is shown. At 200, a technician begins to connect with the network.

Figure 2B:
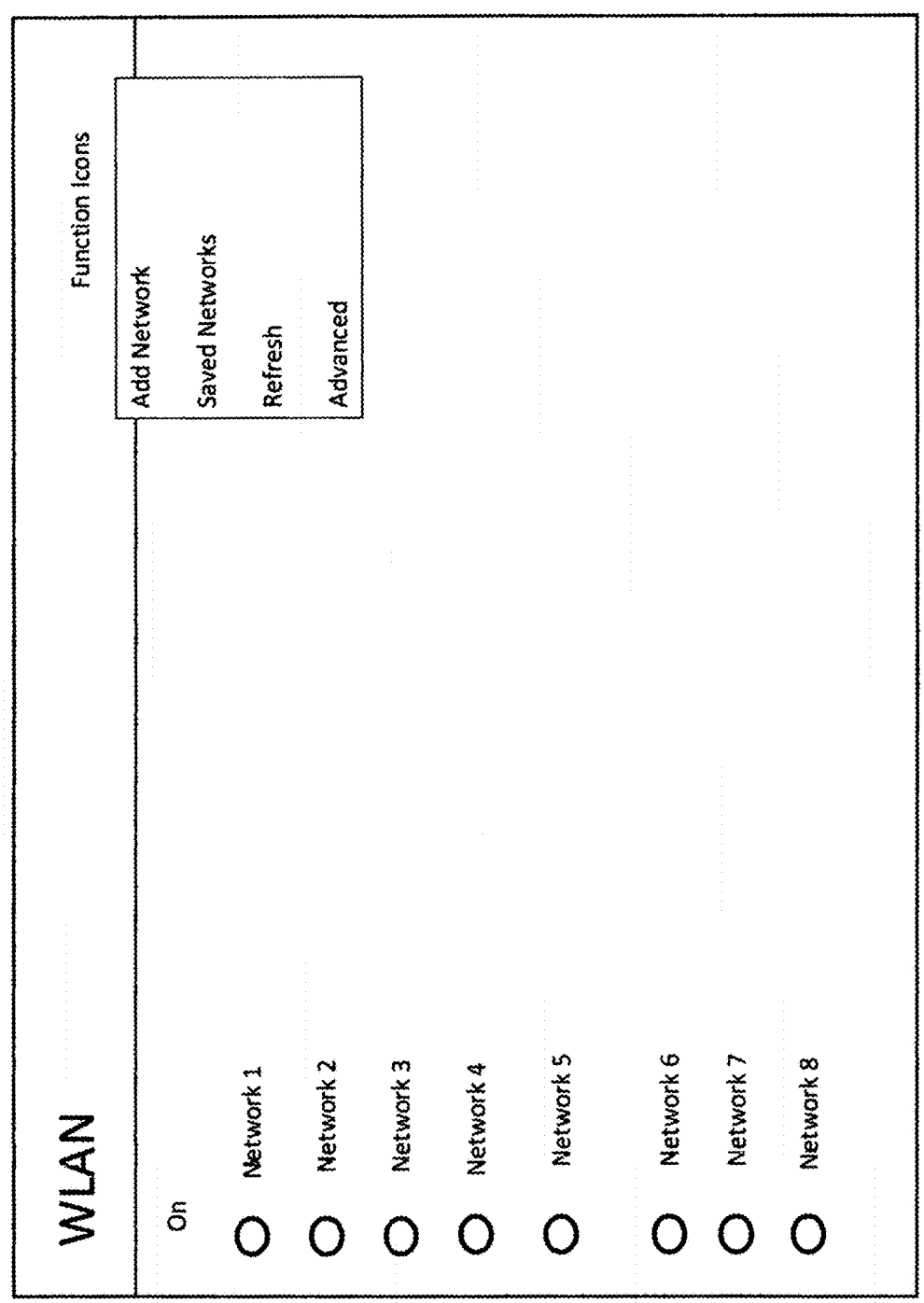
FIG. 2B is an alternative view of a user interface for the pairing of a device with a master coordinator consistent with certain embodiments of the present invention.

Turning now to FIG. 2B, an alternative view of a user interface for the pairing of a device with a master coordinator consistent with certain embodiments of the present invention is shown. At 201, the technician continues with selection of the appropriate network.

Figure 3A:
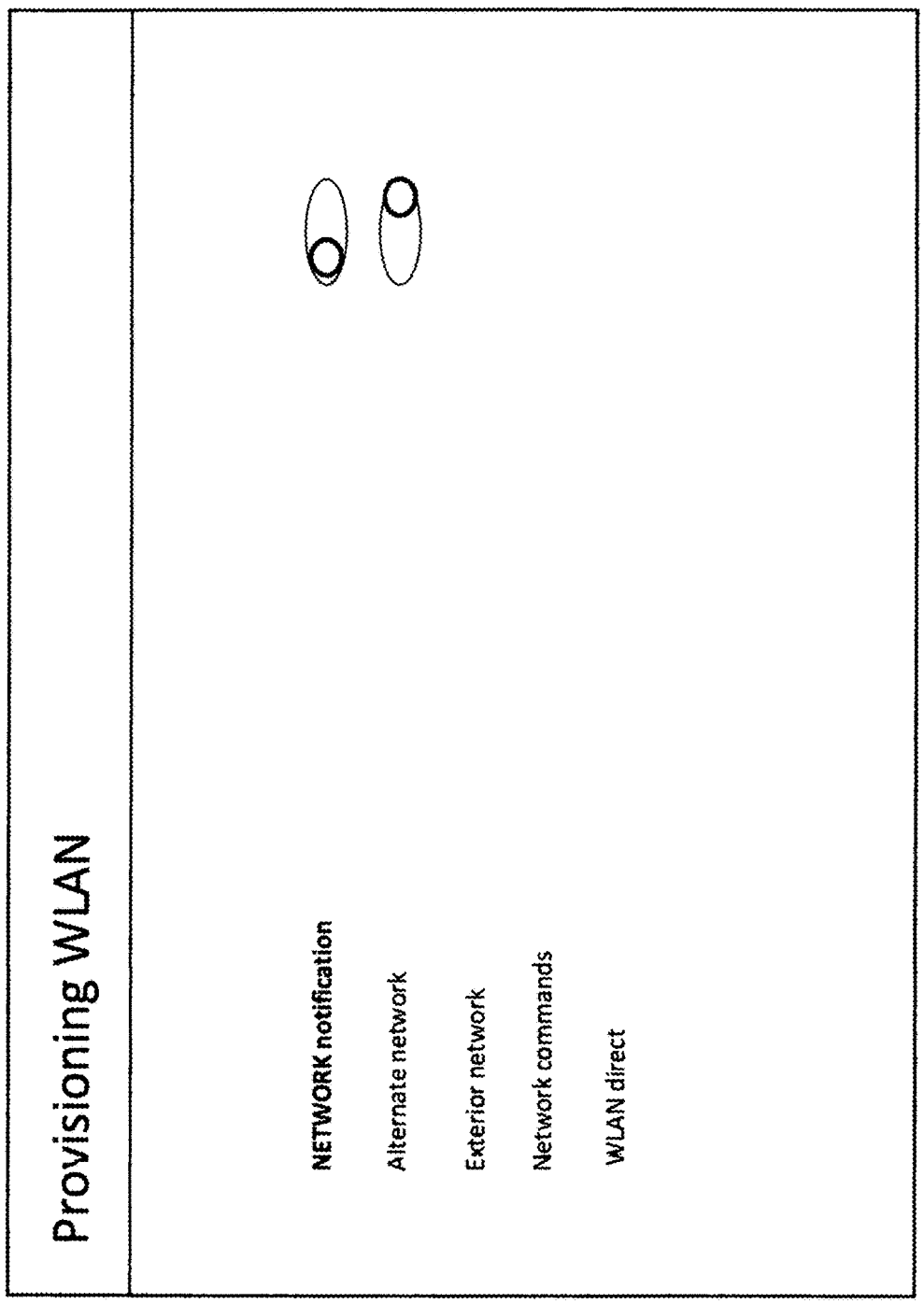
FIG. 3A is a view of a user interface for the pairing of a device with a master coordinator consistent with certain embodiments of the present invention.

Turning now to FIG. 3A, a view of a user interface for the pairing of a device with a master coordinator consistent with certain embodiments of the present invention is shown. At 300 the technician continues to select a network.

Figure 3B:
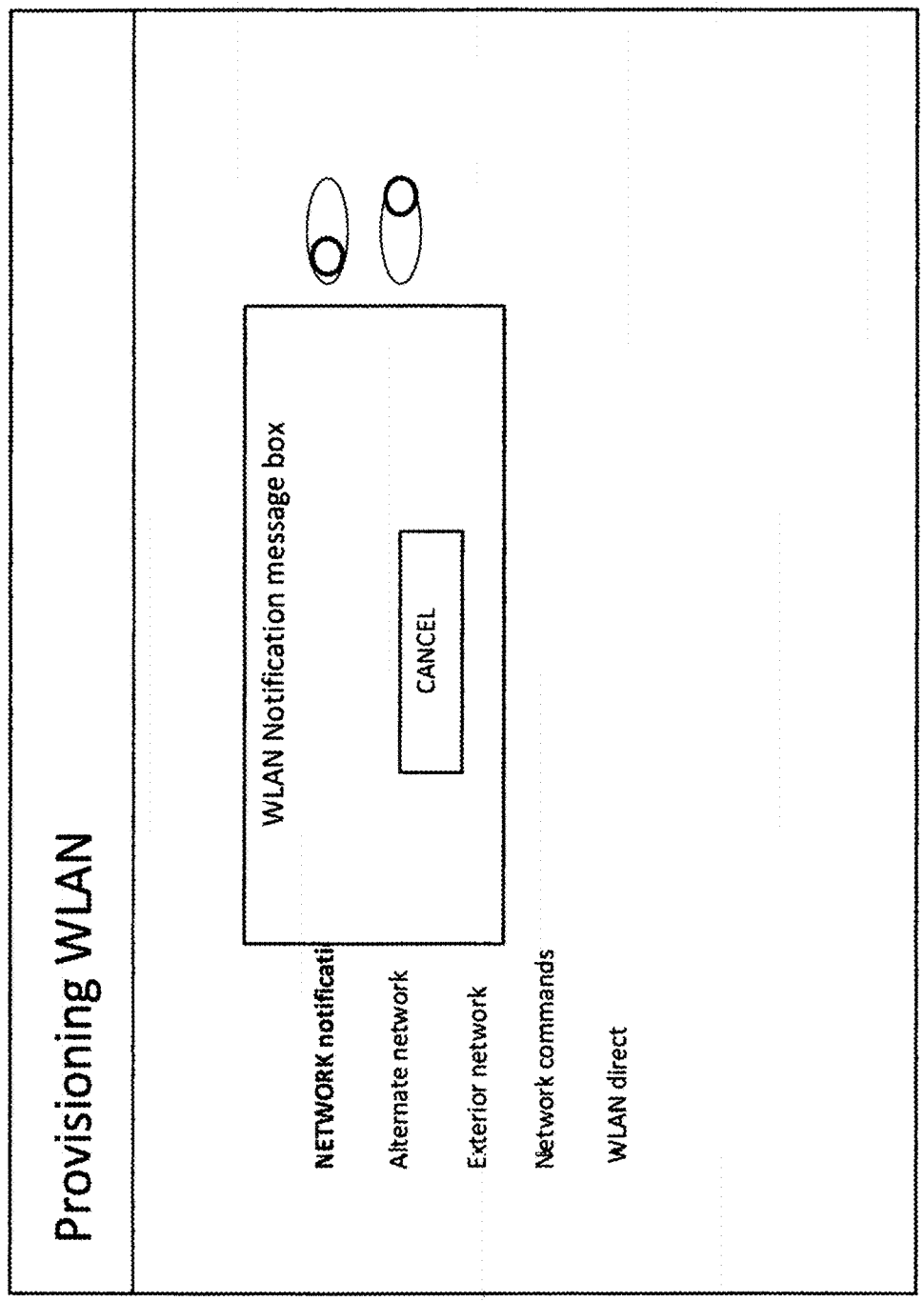
FIG. 3B is an alternative view of a user interface for the pairing of a device with a master coordinator consistent with certain embodiments of the present invention.

Turning now to FIG. 3B, an alternative view of a user interface for the pairing of a device with a master coordinator consistent with certain embodiments of the present invention is shown. At 301, the technician receives confirmation of successful network connection.

Figure 4:
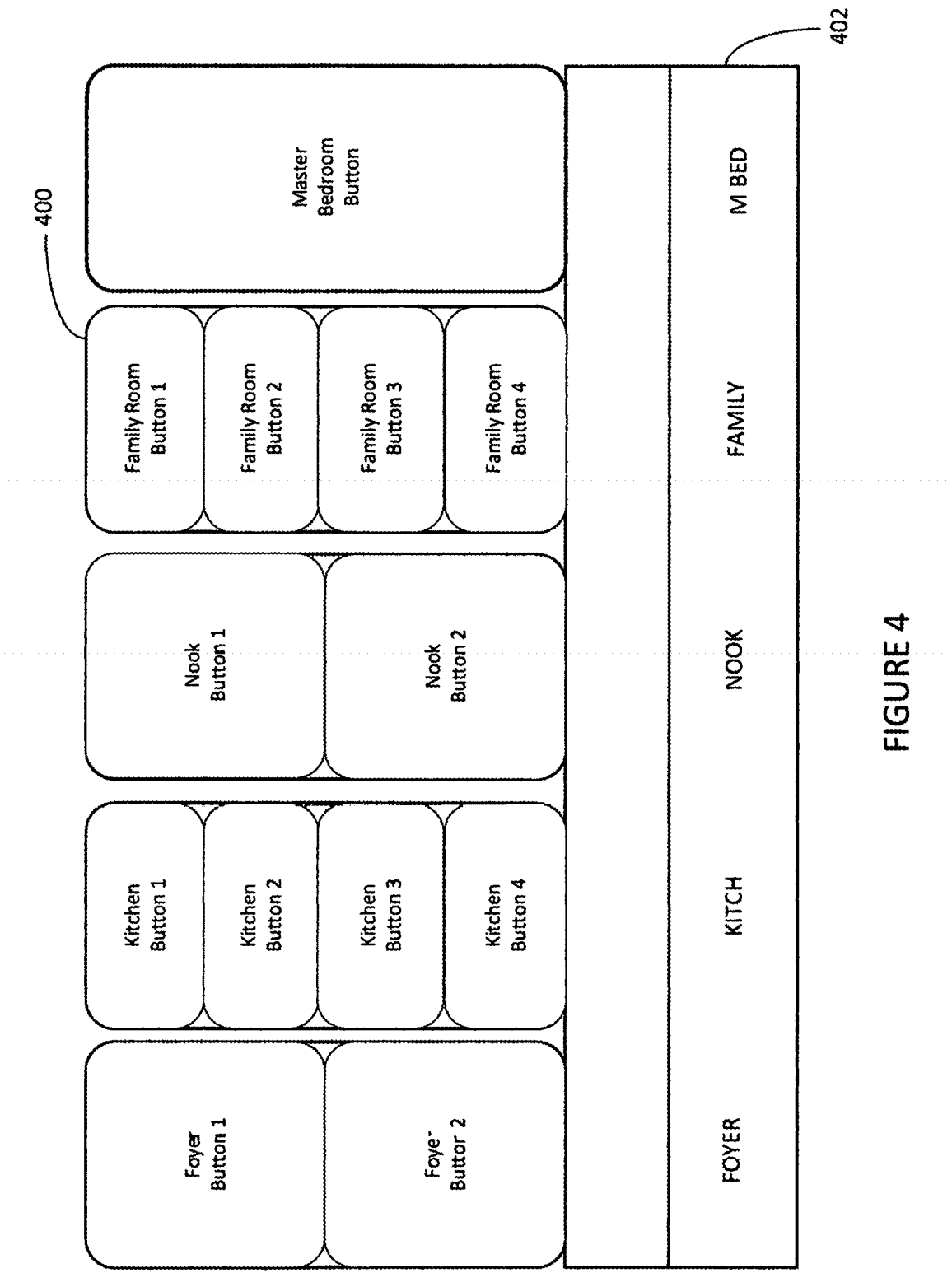
FIG. 4 is a view of a test fixture assemblage consistent with certain embodiments of the present invention.

Turning now to FIG. 4, a view of a test fixture assemblage consistent with certain embodiments of the present invention is shown. The test fixture assemblage is composed of high-level control modules 400 and a test fixture 402. The high-level control modules receive data on a priority basis to other, low-level control modules. In an embodiment, the test fixture is used by the technician and the user. Each control module is associated with a physical space in the user's residence or workplace.

Figure 5:
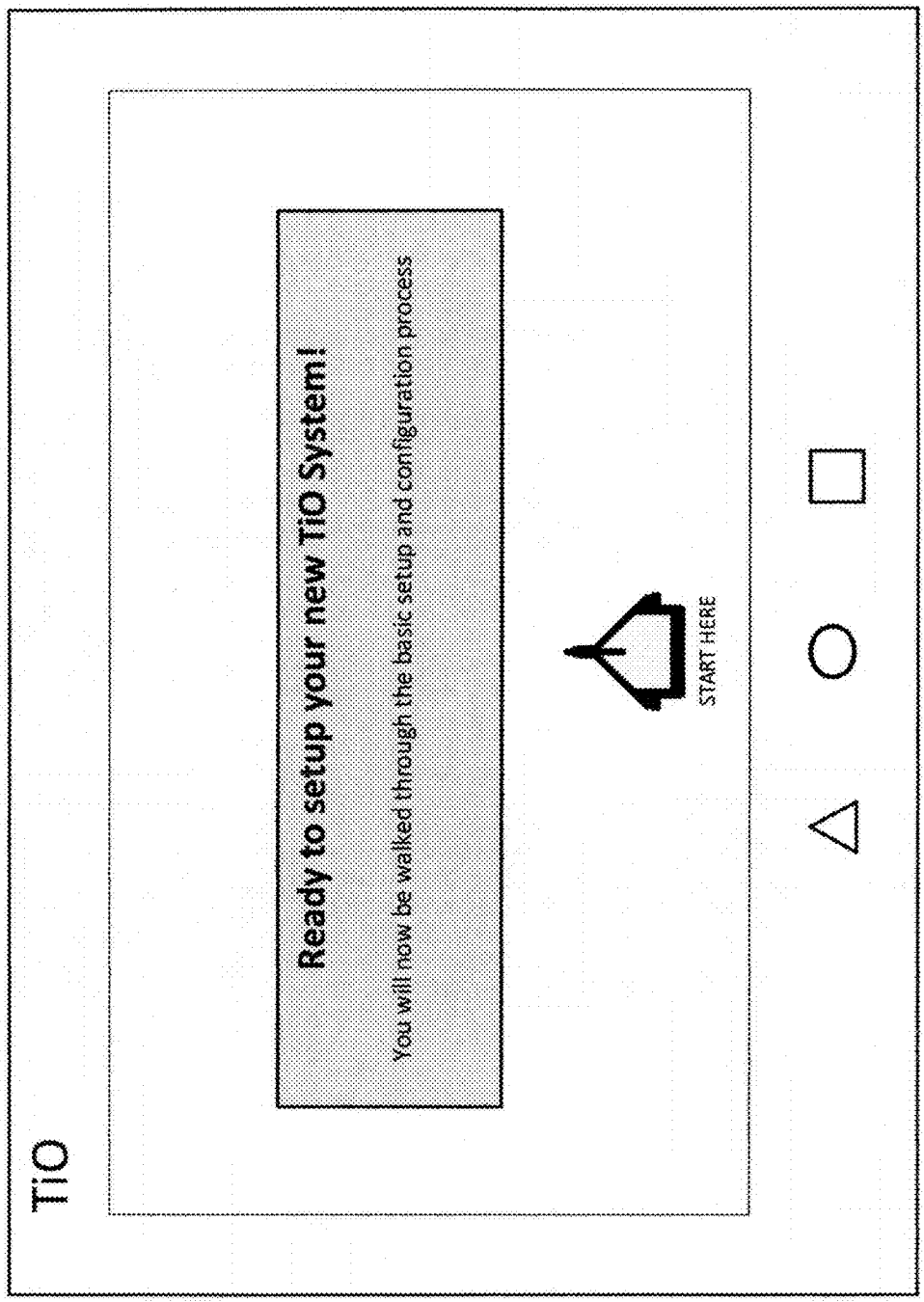
FIG. 5 is a view of a user interface for system setup and configuration consistent with certain embodiments of the present invention.

Turning now to FIG. 5, a view of a user interface for system setup and configuration consistent with certain embodiments of the present invention is shown. In an exemplary embodiment, the ability of network capable devices to connect to and communicate with an external network may begin with one or more network capable devices that are installed within a physical space as system elements. As the user adds network capable devices to the system, the network capable devices are saved to a network association list. Each network capable device is either in automatic association mode when powered up, or the user places each network capable device into automatic association mode for those that are not in automatic association mode when powered up. The master coordinator unit may then look for an association network that has been established within the master coordinator unit. In this exemplary embodiment, if the association network is not currently discoverable or available the master coordinator unit looks for the association network until the association network is available.

If the association network is discovered, each network capable device is authorized to calculate an association network passkey and, utilizing the calculated network passkey, the network capable device establishes a network connection to the association network. Through the established network to the association network within the master coordinator unit, the master coordinator unit retrieves the name and passkey for an exterior network to which the network capable devices are to be connected. The exterior network selection, name and passkey are provided to the master coordinator unit by a user. The master coordinator unit may then communicate the name and passkey of the exterior network to the network capable device. The network capable device then replaces the name and passkey for the association network with the name and passkey for the exterior network. The network capable device may then connect directly to the exterior network.

The master coordinator unit selects the next network capable device in the device list and determines whether the network capable device has an established network connection with the association network. If the network capable device does not have an established connection, the master coordinator unit initiates the association process steps for the network capable device. The association of network capable devices with the association network in the master coordinator unit continues until all network capable devices have established network connections with the association network and with the exterior network.

In a non-limiting example, external network access point name and password identifiers are different for each system installation. However, each network capable device is pre-configured with the ability to programmatically determine a network SSID for the association network maintained in the master coordinator unit. Approved network capable devices can scan for this specific network and create an association between the network capable devices and the master coordinator unit without the intervention of a user or creation of a user interface for each network capable device.

In this exemplary embodiment, a user may initiate the association action between all network capable devices within the residential space. Once all devices have scanned for and connected to the association network maintained by the master coordinator unit, each network capable device is associated with this network.

The master coordinator unit may then establish a connection with the external network access point of the primary network. The user may be requested to enter the physical name and password for the external network access point. Upon entering this information one time, the master coordinator unit passes the external network access point information to each network capable device that is attached to the association network maintained by the master coordinator unit. Each network capable device may then drop the connection with the association network maintained by the master coordinator unit and establish a network connection with the external network access point of the primary network. In this manner, each network capable device achieves a network communication channel connection with an external primary network, permitting a user to access and coordinate all network capable devices installed and configured within the residential dwelling.

Figure 6:
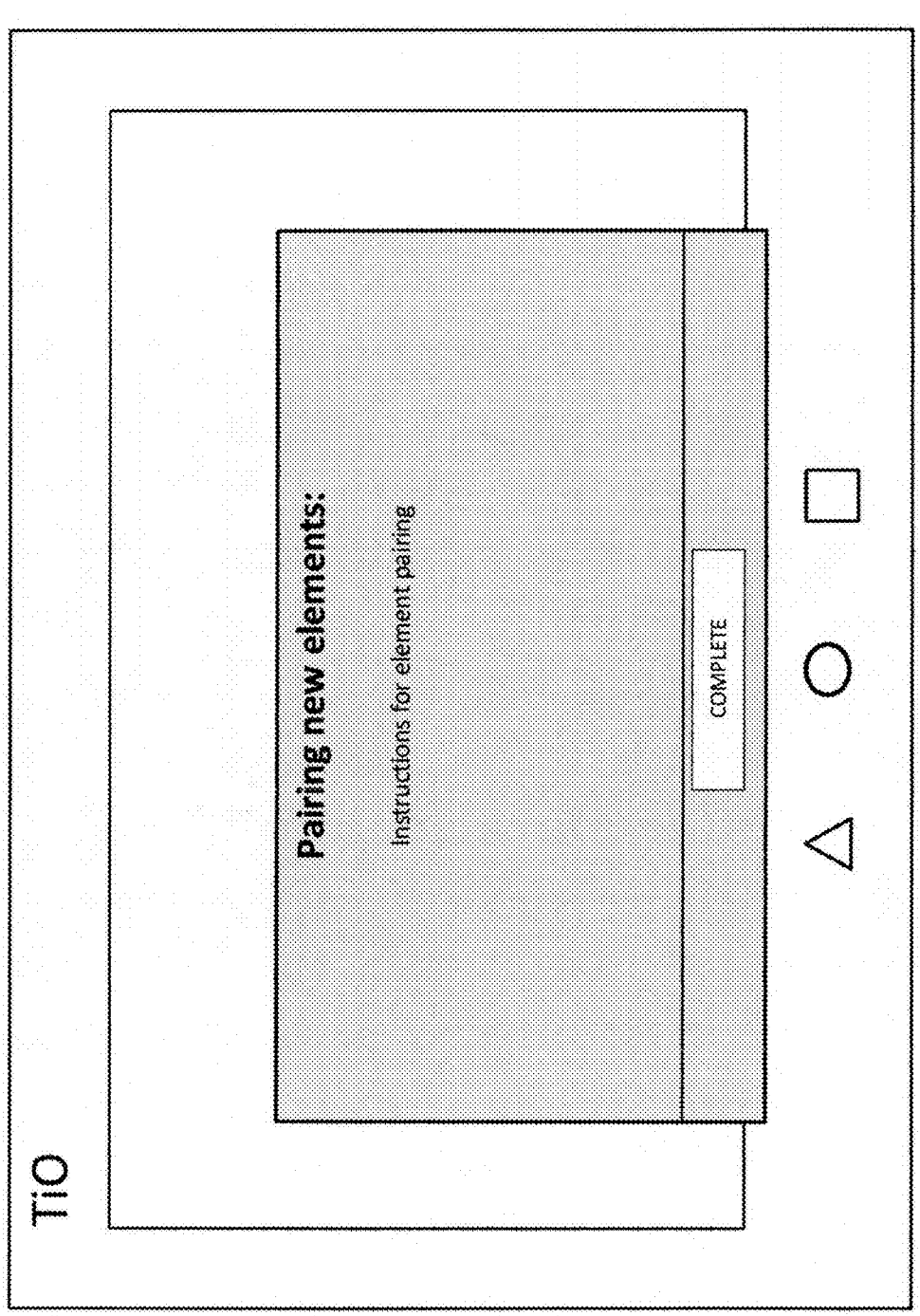
FIG. 6 is a view of a user interface for pairing elements consistent with certain embodiments of the present invention.

Turning now to FIG. 6, a view of a user interface for pairing elements consistent with certain embodiments of the present invention is shown at 600. In an exemplary embodiment, a user may elect to begin the network association steps at any time. To begin, the user selects the "Activate Pairing Mode" indicator. The selection of this indicator permits the master coordinator unit to access the element list and to begin the steps for each element, or network capable device, to calculate the passkey needed to connect the element to the association network established within the master coordinator unit. The selection of the "Activate Pairing Mode" indicator also permits the user to add new elements to the element list.

The user may initiate the pairing process or add new elements to the element list. The user may be presented with the option to continue to add new elements by restoring the element list and permitting the user to input data into the screen. In an alternative response, the user may be presented with an initiate selection box. If the user selects the initiate selection box, the paring process will be started.

If the user is not ready to initiate the pairing function, the user may instead select the "cancel" button and stop any pairing function.

In this exemplary embodiment, upon an indication from the user that the pairing process should proceed, the user interface display screen presents an informational dialog box indicating that the pairing process steps are being performed for each element in the element list. The user may be presented with an informational message such as "Please place all new TiO elements into pairing mode" or the like.

Upon completion of the pairing process, each network capable device, or element, will have been paired with first the association network established and maintained by the master coordinator unit, followed by the association with an external network. The completion of the pairing will be indicated to the user by a "Finished" informational message.

Figure 7:
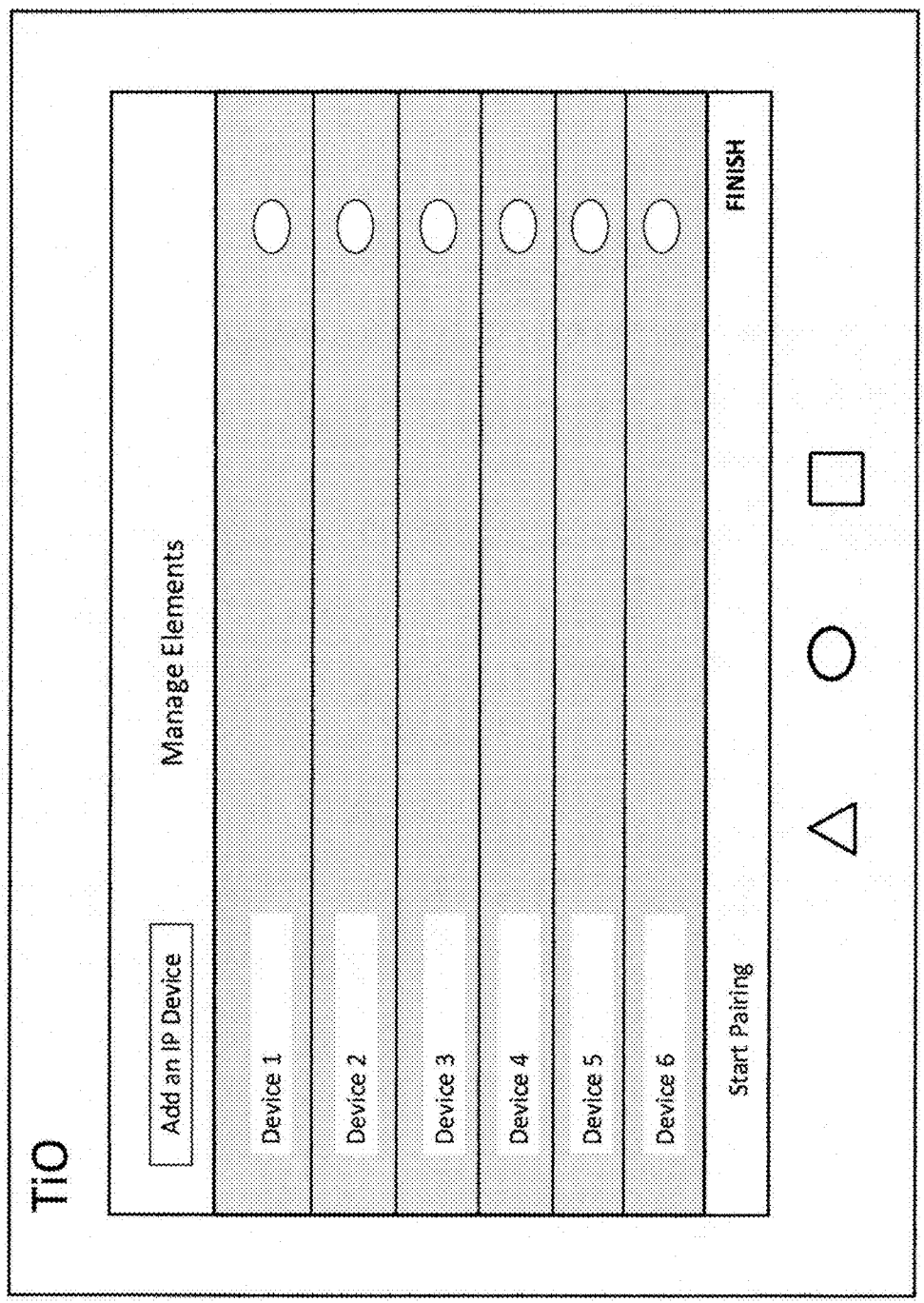
FIG. 7 is a view of a user interface for updating elements consistent with certain embodiments of the present invention.

Turning now to FIG. 7, a view of a user interface for updating elements consistent with certain embodiments of the present invention is shown. At 700 a user is shown a list of all networked devices available for control by the master coordinator.

Figure 8:
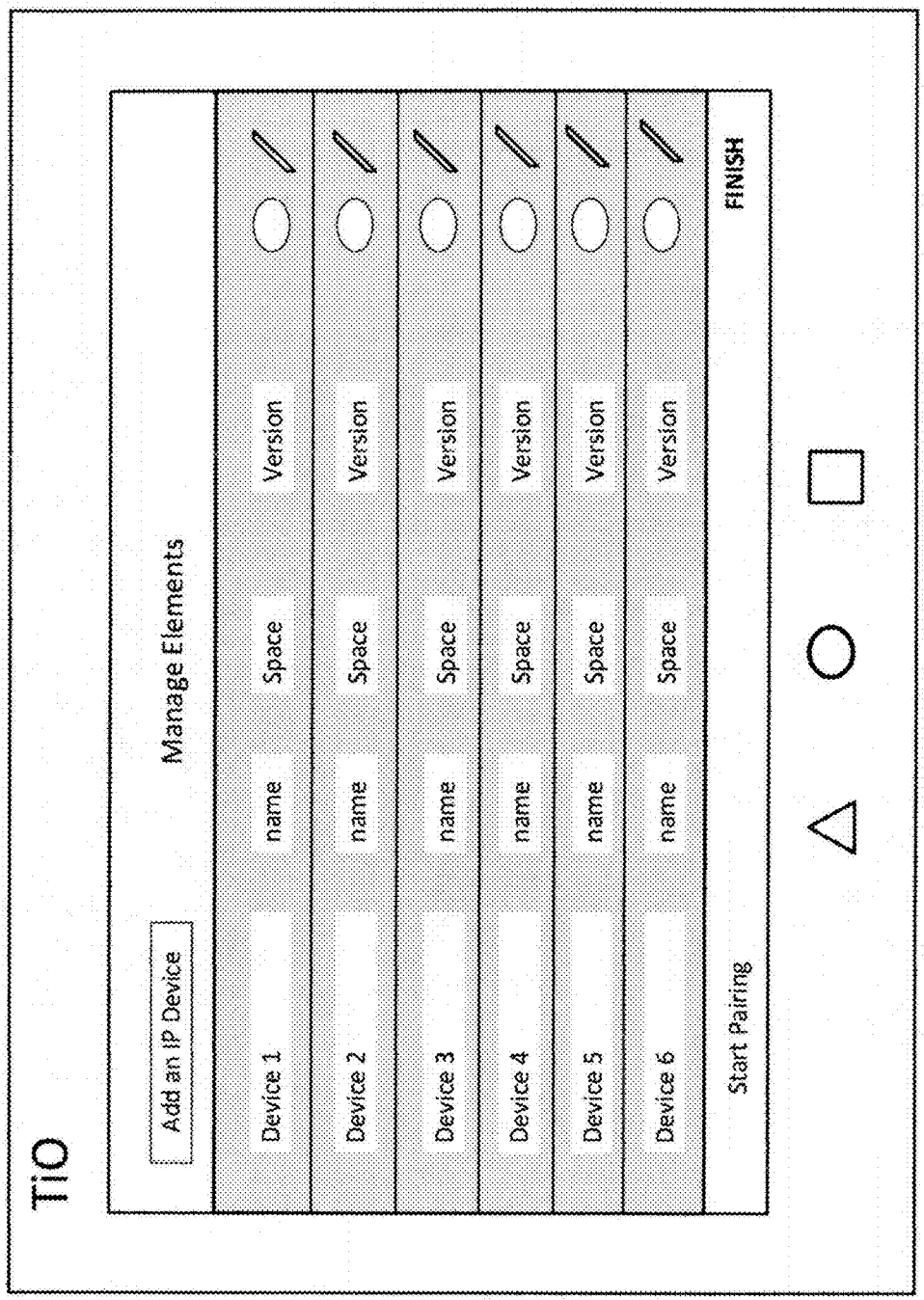
FIG. 8 is a view of a user interface for identifying elements consistent with certain embodiments of the present invention.

Turning now to FIG. 8, a view of a user interface for identifying elements consistent with certain embodiments of the present invention is shown. In an exemplary embodiment, upon connection with the system through automatic association, each element associated with the system will appear in an association and pairing list from which the user may select elements for placement in an action list. At 800 the user is presented with a management display that may contain the commands and control to manage the inclusion or removal of association ready network capable devices from the network association and pairing list. Network capable devices are identified as elements by the user including them in an element list. Additional parameters associated with the elements may include additional naming, such as, in a non-limiting example, a known or "friendly" name, a space name with which the element is to be associated, and an indication of the software version for the management software. These naming conventions should be considered as examples of the naming indicators and should in no way be considered limiting as alternative naming conventions may be utilized within the system.

In this exemplary embodiment, the user may have a search function available for use in locating and identifying elements to be included in the element list. A user may select the search function and be presented with an element, either by a name or other element identifier. The user may be given the option to select the discovered element or restart the search to locate other elements available for inclusion in the element list. The user may be given the option to modify, amend, or change the name of the discovered element to a "friendly" name. The user may also be provided with the option to enter the name of the space in which the element is installed. When all elements have been discovered and added to the element list in which the user has an interest, the user may be presented with an option to save the selected list and additional information into the element list data table maintained by the master coordinator unit. This element list data table may later be retrieved by the master coordinator unit to permit the network association process to proceed.

Figure 9A:
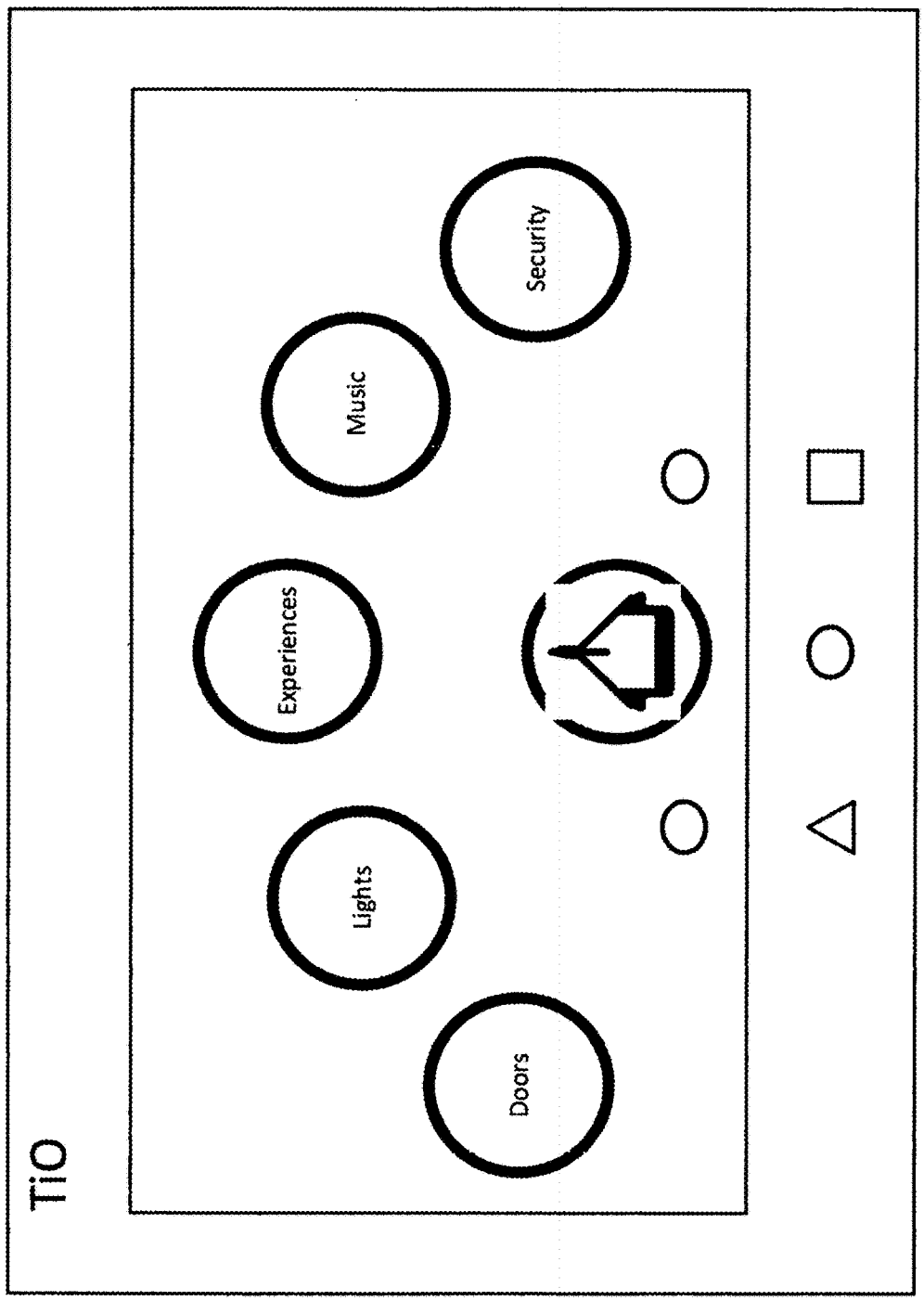
FIG. 9A is a view of a user interface for creating user moods consistent with certain embodiments of the present invention.

Turning now to FIG. 9A, a view of a user interface for creating user moods consistent with certain embodiments of the present invention is shown. In an embodiment, the user may choose to capture a mood by selecting the mood icon on the user display at 900.

Figure 9B:
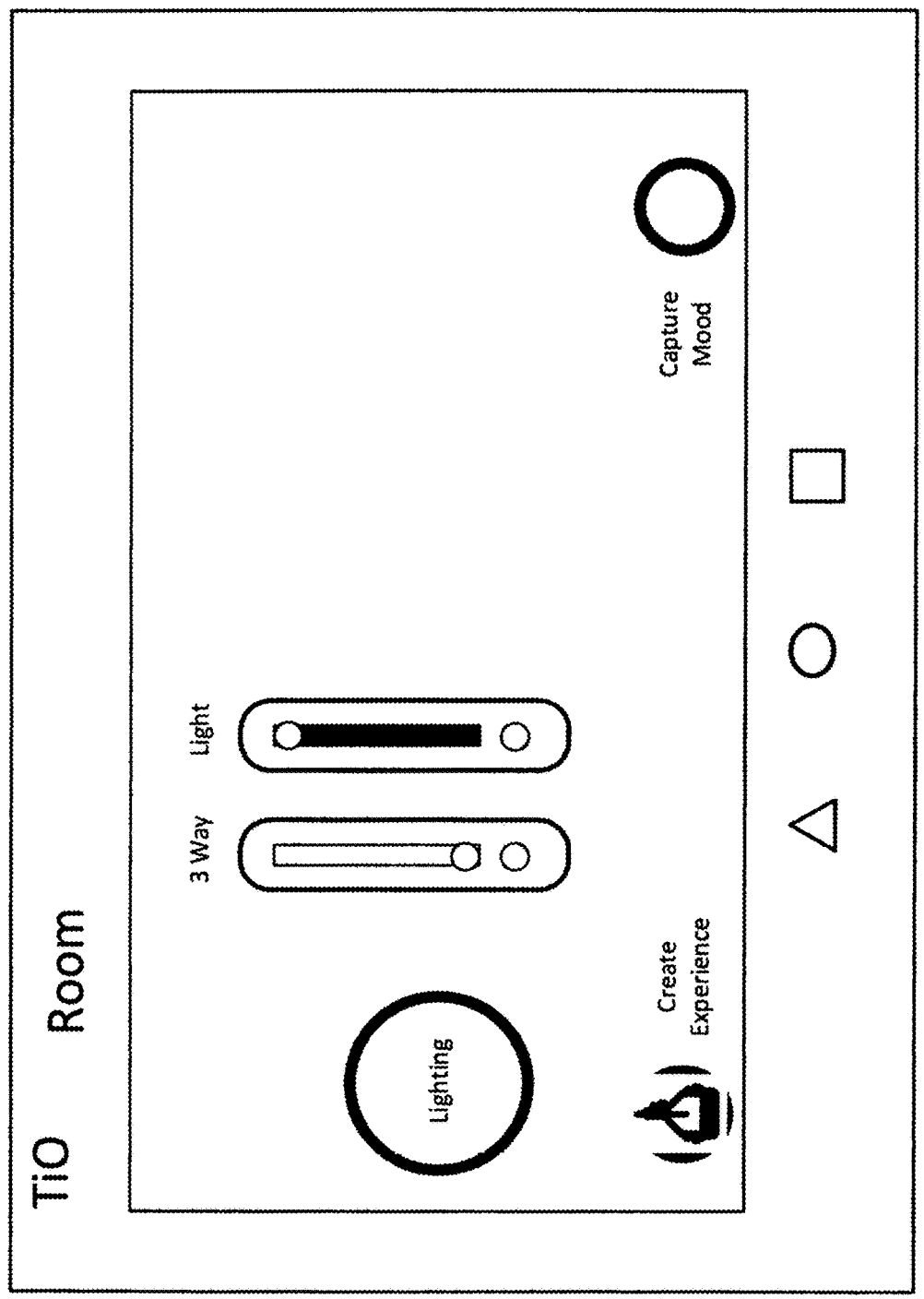
FIG. 9B is an alternate view of a user interface for creating user moods consistent with certain embodiments of the present invention.

Turning now to FIG. 9B, an alternate view of a user interface for creating user moods consistent with certain embodiments of the present invention is shown. In an embodiment, the user may choose to specify mood attributes by toggling among options on user interface at 902.

Figure 10:
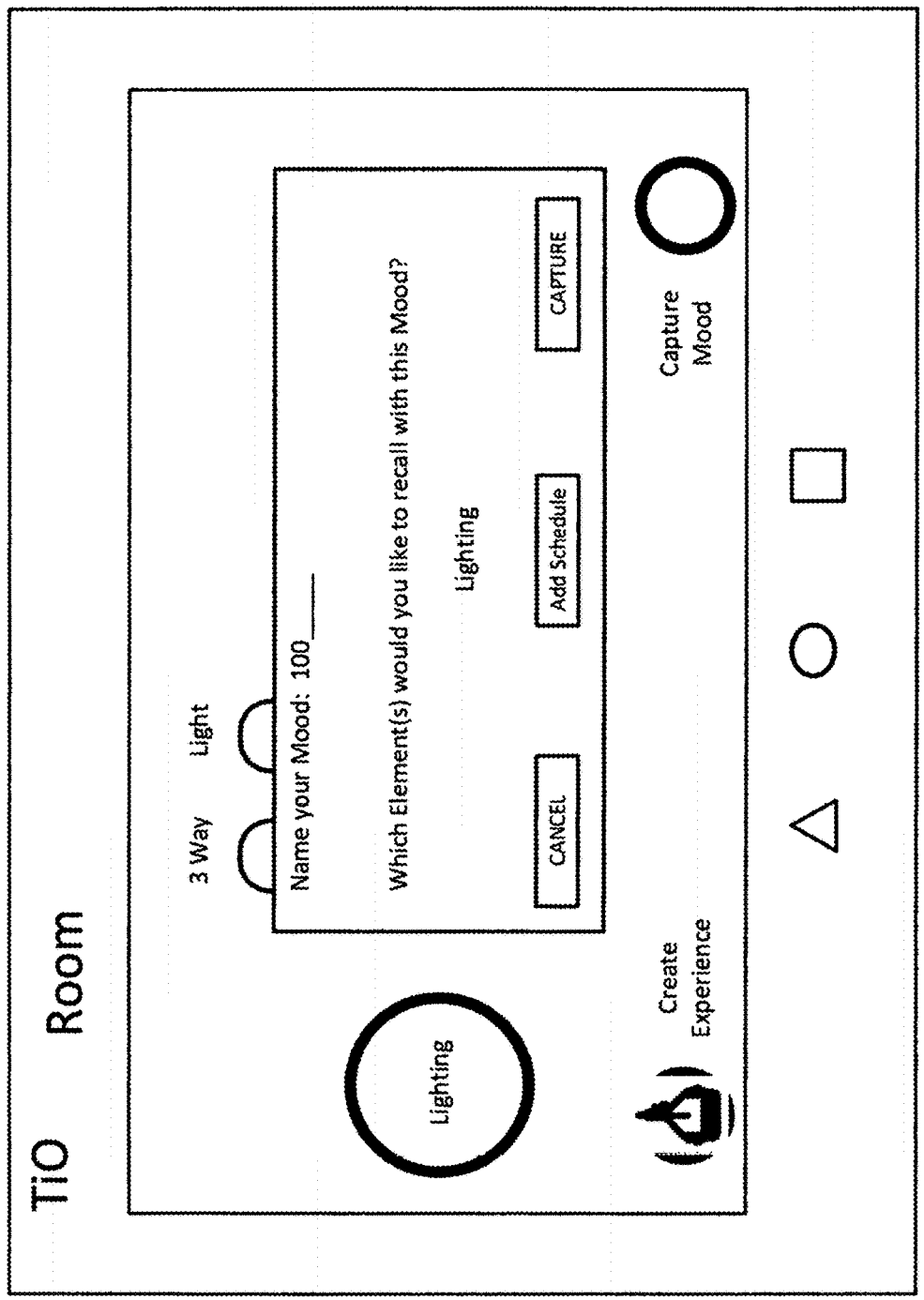
FIG. 10 is a view of a user interface for creating user moods consistent with certain embodiments of the present invention.

Turning now to FIG. 10, a view of a user interface for creating user moods consistent with certain embodiments of the present invention is shown. In an embodiment, user may choose at 1000 to give a name to the specific mood created.

Figure 11A:
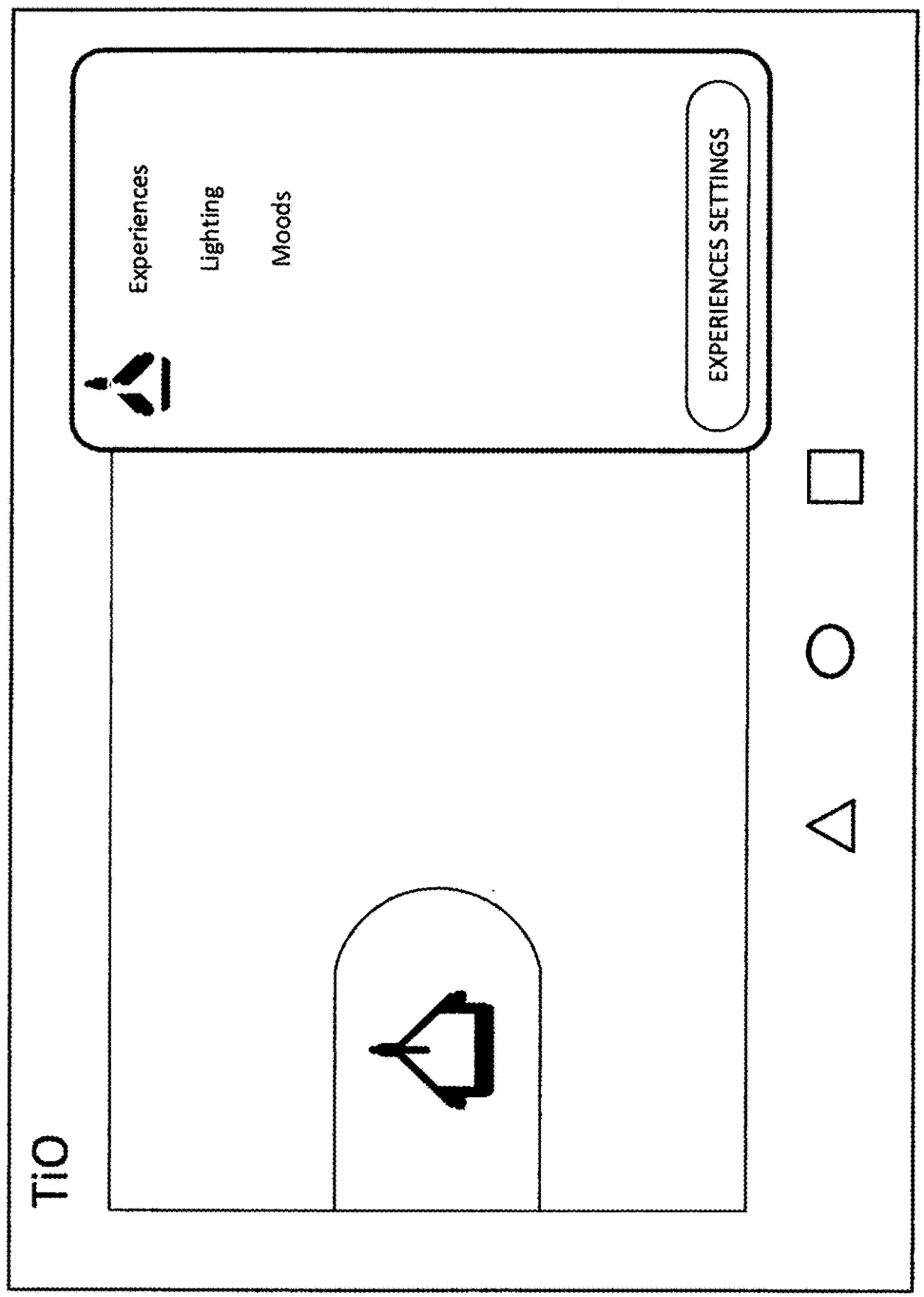
FIG. 11A is a view of a user interface for creating user experiences consistent with certain embodiments of the present invention.

Turning now to FIG. 11A, a view of a user interface for creating user experiences consistent with certain embodiments of the present invention is shown. In an exemplary embodiment, an experience is a collection of moods that can be defined and/or activated through the use of a mobile application on a mobile device. The experience may also be activated through a button press on a light switch or may be defined to be activated at a designated date and time. In this exemplary embodiment, upon the selection of the create experience icon from a computer browser or mobile device display, the user is presented with a Create an Experience display at 1100.

Figure 11B:
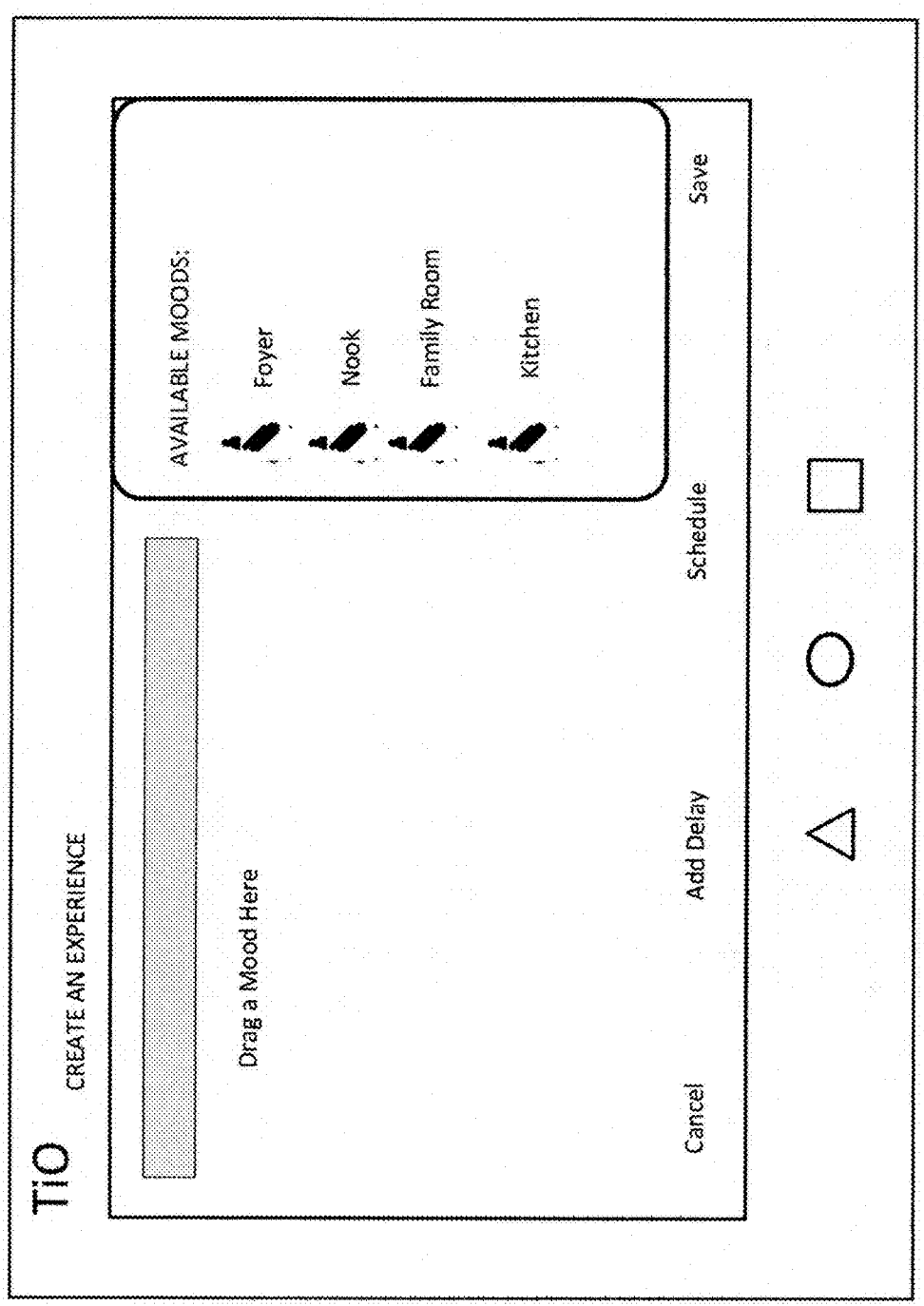
FIG. 11B is an alternate view of a user interface for creating user experiences consistent with certain embodiments of the present invention.

Turning now to FIG. 11B, an alternate view of a user interface for creating user experiences consistent with certain embodiments of the present invention is shown. At 1102 the user is presented with a list of moods that have been, or may be, defined for use with the named experience. The user is also presented with a list of available moods that may be selected for association with the named experience.

Figure 12:
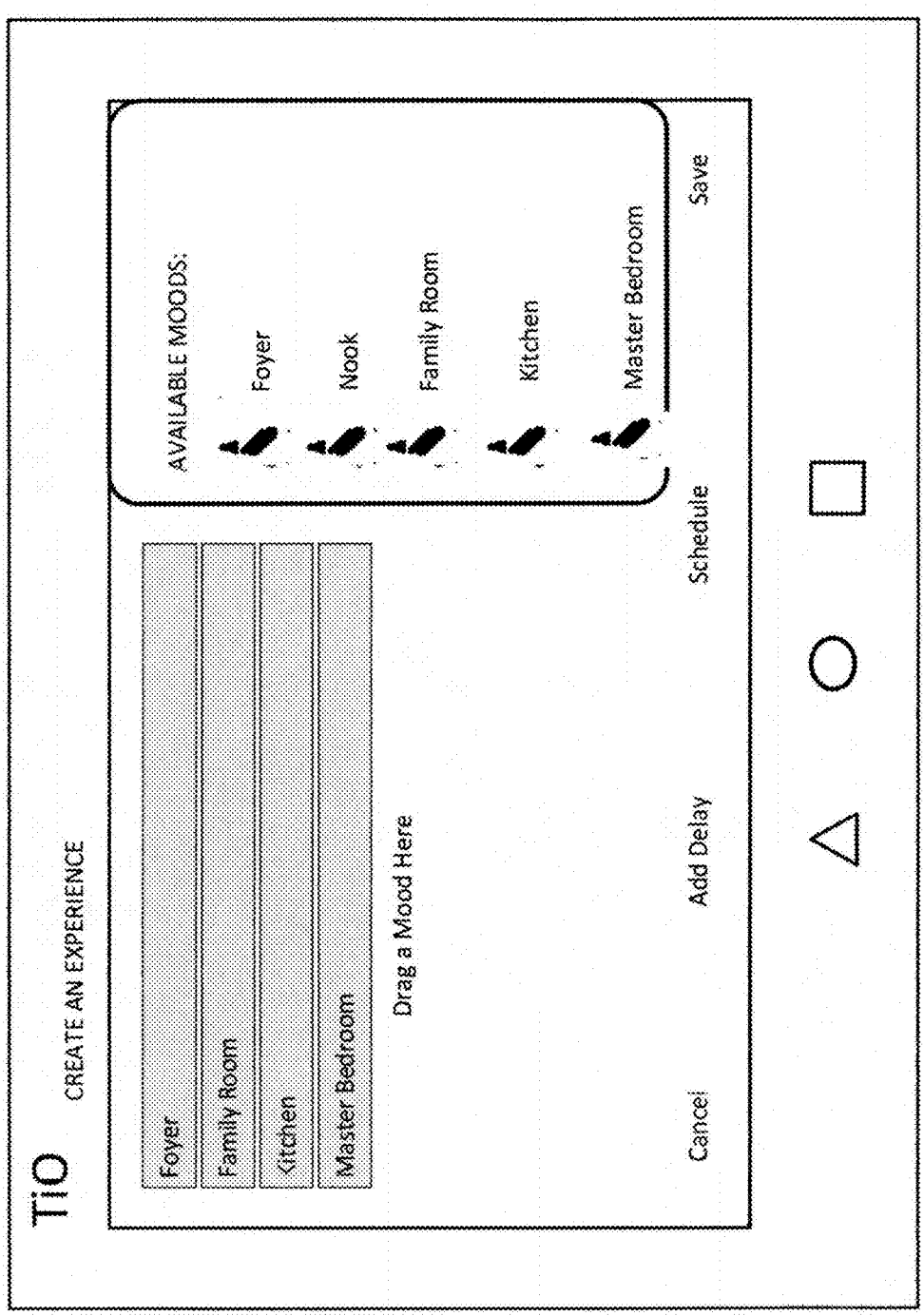
FIG. 12 is a view of a user interface for creating user experiences consistent with certain embodiments of the present invention.

Turning now to FIG. 12, a view of a user interface for creating user experiences consistent with certain embodiments of the present invention is shown. In an embodiment, a user may at 1200 select the name of a mood from the list of available moods. The mood may then be dragged to the list of moods section of the screen display and the mood dropped into the existing list of moods. If a list of moods does not currently exist for the experience, dropping the named moods onto the list of moods is sufficient to create the experience in the system and attach the named mood to the newly created experience.

If the user is satisfied with the moods added to the experience, the user may select the save icon to commit the updates, additions and changes to the database associated with the experience. If, however, the user does not want to save the information entered, the user may select the cancel icon to remove the updates, additions and changes and return to the previous screen display.

While certain illustrative embodiments have been described, it is evident that many alternatives, modifications, permutations and variations will become apparent to those skilled in the art in light of the foregoing description.

What is claimed is:

1. A system, comprising:
a master control module capable of communicating an association network name to one or more network capable devices installed on a home network;
creating predefined electric and electrical device settings associated with the association network name and actionable by the master control module;
creating a customized installation program for a plurality of devices, moods, experiences, and network connectivity among said one or more network capable devices according to user direction;
installing said customized installation program within said master control module and one or more associated control modules;
packaging the master control module and one or more associated control modules in a physical conveyance capable of being conveyed to a user; and
the master control module capable of ready installation of predefined device settings by automatically replacing the association network name with the home network.

2. The system of claim 1, further comprising a user accessible display for creating predefined device settings.

3. The system of claim 2, where the user accessible display is temporarily paired to the master control module.

4. The system of claim 1, where predefined device settings are mandated by the user.

5. The system of claim 1, where predefined device settings represent moods and/or experiences.

6. The system of claim 1, further comprising device fixtures capable of receiving input from the master control module.

7. A method, comprising:
- configuring a master control module capable of communicating an association network name to one or more network capable devices installed on a home network;
- creating predefined electric and electrical device settings associated with the association network name and actionable by the master control module;
- creating a customized installation program for a plurality of devices, moods, experiences, and network connectivity among said one or more network capable devices according to user direction;
- installing said customized installation program within said master control module and one or more associated control modules;
- packaging the master control module and one or more associated control modules in a physical conveyance capable of being conveyed to a user; and
- the master control module being capable of ready installation of predefined device settings by replacing the association network name with a home network.

8. The method of claim 7, further comprising a user accessible display for creating predefined device settings.

9. The method of claim 8, where the user accessible display is temporarily paired to the master control module.

10. The method of claim 7, where predefined device settings are mandated by the user.

11. The method of claim 7, where predefined device settings represent moods and/or experiences.

12. The method of claim 7, further comprising device fixtures capable of receiving input from the master control module.

* * * * *